2,979,952
PNEUMATIC TEMPERATURE INDICATOR

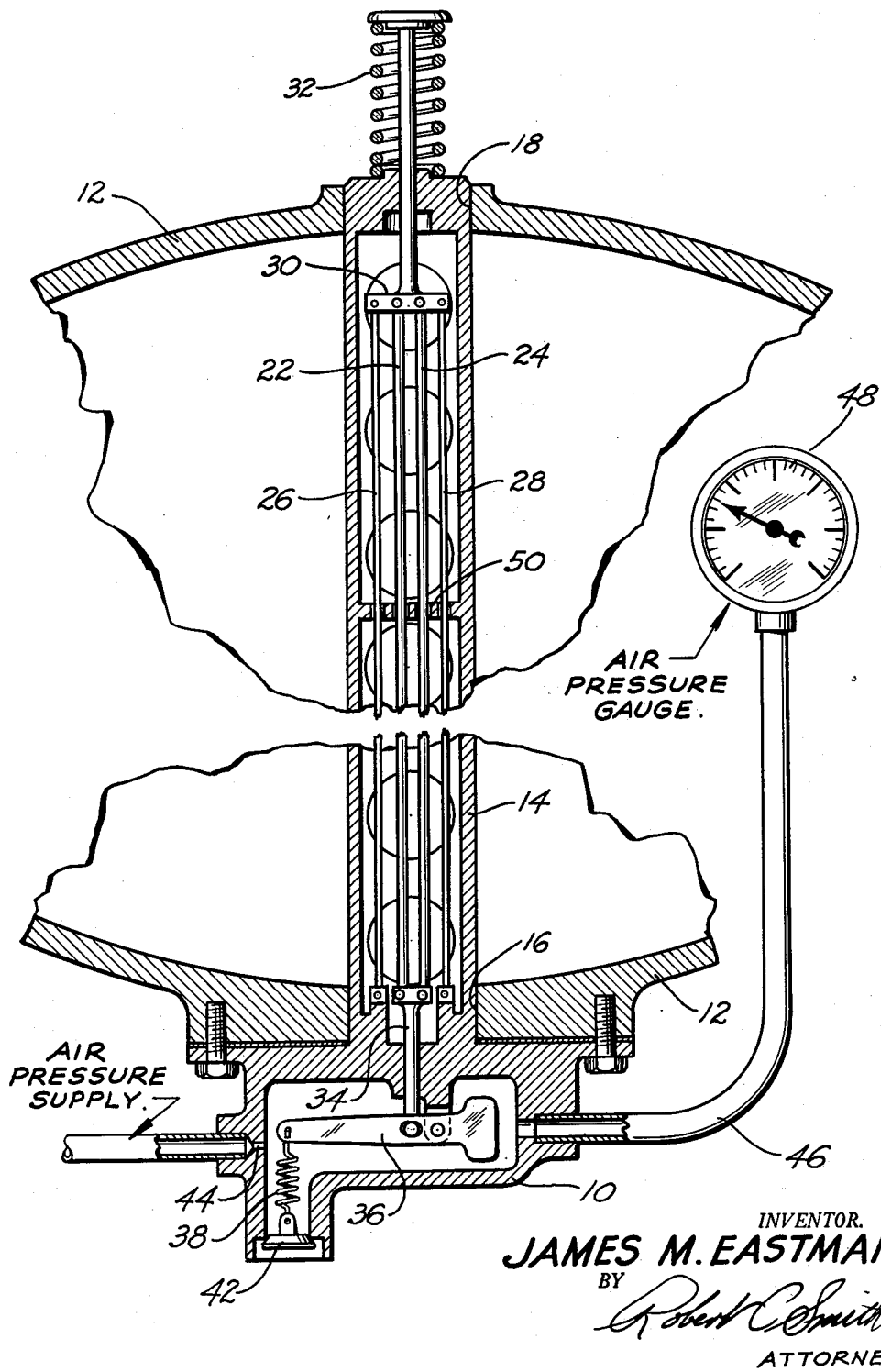

James M. Eastman, South Bend, Ind., assignor to The Bendix Corporation, a corporation of Delaware Filed Aug. 20, 1956, Ser. No. 605,106

6 Claims. (Cl. 73—363.3)

The present invention relates to temperature sensing devices and more particularly to a device capable of producing a pneumatic signal variable with the average temperature of fluid flowing in a large conduit such as the tailpipe of a gas turbine engine.

In the field of temperature sensing and temperature control, thermocouples or differential thermo-expansion means are customarily used for sensing temperature. For use in sensing tailpipe temperatures of a gas turbine engine, the thermocouple suffers from the following disadvantages: (1) It senses the temperature in a limited zone, requiring multiple installations to sense average temperature in a conduit where temperature distribution is poor, and (2) It requires electrical amplification and motor means to indicate or control temperature. Bimetal strips used for differential thermo-expansion ordinarily suffer from high thermo stresses over high temperature ranges and are limited by creep strength. Other forms of differential expansion devices generally suffer from slow response.

It is, therefore, an object of the present invention to provide a temperature sensing device which is capable of providing a signal varying with average temperature values in a conduit even though the temperature distribution may be poor.

It is another object of the present invention to provide a temperature sensing device which has generally fast response and which is capable of providing an output signal of sufficient size to be useful without further amplification.

It is a further object to provide a temperature sensing device which will incorporate the above objectives and which will also provide an inherent anti-hunting function.

Other objects and advantages will become apparent from the following specification taken in connection with the accompanying drawing, in which:

The single figure shows a cross-sectional view of my temperature sensing device installed in a large conduit.

Referring to the drawing, my temperature sensing device consists of a housing 10 which is attached to the outside of a large conduit 12 in which the fluid which it is desired to measure is confined. Attached to housing 10 is an elongated perforated tube 14 which is installed through holes 16 and 18 in the side wall of conduit 12 in such a manner that the tube 14 extends across the diameter of conduit 12. Within the tube 14 are temperature sensing wires 22, 24, 26 and 28 over which the fluid flows as it passes through the perforations in tube 14. The wires 26 and 28 are anchored to a fixed part of the tube and are fastened at the top to a member 30 which maintains the wires in tension through the action of a spring 32. Wires 22 and 24 are also fastened at the top to member 30, but are fastened at the bottom to a member 34 which, in turn, is pinned to a lever 36 such that a spring 38 maintains the wires 22, 24 in tension. The load on spring 32 is high enough to insure that spring 38 will never overpower it and that the wires 26, 28 will always be in tension. Wires 26, 28 are of smaller diameter than wires 22, 24 and are made of a different material having a higher thermal expansion coefficient. Member 34 is thereby moved upward with increasing temperature and in proportion with the difference in thermal expansion coefficients of the two wire materials. For rapid temperature changes, however, member 34 moves more, because wires 22, 24, being heavier, have more lag time in reaching temperature equilibrium. Thus, the temperature response approaches proportionality with the thermal expansion coefficient of wires 26, 28. This results in sensitivity of the motion of member 34 not only to temperature change, but to rate of temperature change as well. This rate or phase lead characteristic is determined by the thermal time constants and expansion coefficient of the wires 22, 24, 26 and 28. The time constants are controlled by the wire diameters and the expansion coefficients by the wire materials. These characteristics are to be controlled to produce optimum phase lead for either (1) compensation of thermal lag in wires 26, 28 to produce the most dynamically accurate correlation of the position of member 34 with temperature, or (2) stabilizing an automatic temperature control system wherein member 34 is a part of the temperature sensing component. The movement of member 34 is amplified and transferred to the spring 38 through the action of lever 36. Thus the tension in spring 38 is controlled by the fluid temperature in conduit 12. The bottom of spring 38 is attached to a valve 42 which is in series with a restriction 44 between a source of air pressure and the atmosphere. The tension on spring 38 determines a pressure drop across valve 42 for which it will be in equilibrium. The valve seeks this equilibrium by opening when the pressure exceeds the equivalent spring tension and vice versa. Therefore, a difference between the pressure in housing 10 and atmospheric pressure is maintained proportional with the temperature indication of the member 34. Since the pressure regulating movement of valve 42 is small compared with the movement of the top of spring 38 with temperature, the error in regulated pressure due to the movement of valve 42 is negligible. The regulated pressure may be carried by a conduit 46 to a remotely positioned pressure sensitive gauge 48 calibrated for fluid temperature, or the pressure may be carried to a pressure sensitive element in an automatic temperature control system as its temperature sense. Perforated diaphragms such as that shown at numeral 50 may be located in a tube 14 as needed to guide wires 22, 24, 26 and 28 to prevent bowing or excessive vibration. The tube vent holes or perforations may be made of such spacing and size as to avoid excessive fluid forces on the wires while maintaining adequate fluid turbulence and velocity in the tube to provide good heat transfer to the wires.

While only one embodiment has been shown and described herein, modifications may be made to suit requirements.

I claim:

1. In a device for indicating the temperature of fluid in a conduit having a housing containing a fluid pressure chamber, a fluid pressure source and an inlet conduit connecting said source with said chamber, a fluid outlet port in said chamber, a valve operable to control the effective area of said outlet port and vary the pressure of fluid contained in said chamber, and means connected to said chamber responsive to the variations of pressure therein: the combination of a perforated elongated chamber exposed to the temperature to be sensed, a spring loaded member extending through one end of said perforated chamber, a pair of flexible wires connected to said member and to the opposite end of said perforated chamber in such manner as to be always in tension, a second member slidably positioned in said housing and extending from said fluid pressure chamber to said perforated chamber, a second pair of flexible wires having a temperature coefficient of expansion different from that of said first named pair of wires connected between said members, said second member operably connected to said valve to vary the pressure of fluid in said chamber as a function of variations in sensed temperature.

2. In a device for indicating the temperature of fluid in a conduit having a housing containing a fluid pressure chamber, first means for varying the fluid pressure in said chamber, and second means for sensing the fluid pressure in said chamber: the combination of a perforated elongated chamber adjacent to said housing and exposed to the temperature to be sensed, a spring loaded member extending through the end of said perforated chamber, a first plurality of flexible wires in said perforated chamber connected to said member and to said housing, a second plurality of flexible wires in said perforated chamber connected to said member and to said fluid pressure varying means, said first plurality of flexible wires having a temperature coefficient different from said second plurality of flexible wires.

3. A temperature sensing device comprising a perforated elongated chamber exposed to the temperature to be sensed, a first sliding member extending through one end of said chamber, a first wire connected to said first sliding member and the opposite end of said chamber, a first spring member operable to apply a force to said first sliding member in such manner that said first wire is always in tension, a second sliding member extending through said opposite end of said chamber, a second wire connected to said first and second sliding members, a second spring member operable to apply a force to said second sliding member in such manner that said second wire is always in tension and said second sliding member is positioned in response to variations in lengths of said first and second wires, said second wire having a different coefficient of expansion than said first wire to permit movement of said second sliding member as a function of variations of said sensed temperature.

4. A temperature sensing device as set forth in claim 3 wherein said second wire has a different cross sectional area from said first wire to permit movement of said second sliding member in response to variations in rate of change of said sensed temperature.

5. A temperature sensing device comprising a perforated elongated chamber exposed to the temperature to be sensed, a spring loaded member extending through one end of said chamber, a first wire connected to said spring loaded member and the opposite end of said chamber in such manner as to be always in tension, a positioned member slidably mounted and extending through the opposite end of said perforated chamber, a second wire connected to said spring loaded member and said positioned member, spring means operable to keep said second wire always in tension, such that said positioned member is controlled as a function of the lengths of said first and second wires, said second wire having a greater cross sectional area than said first wire to provide slower response to a change in said sensed temperature and control said positioned member as a function of the rate of change of sensed temperature.

6. A temperature sensing device for sensing the temperature of fluid confined in a conduit comprising a spring loaded member extending on one end into said conduit, a housing structure protruding into said conduit at a point substantially diametrically opposite said spring loaded member, a first wire in said conduit connected to said housing structure and to said spring loaded member in such manner as to be always in tension, a sliding member extending through said housing structure into said conduit, a second wire connected to said spring loaded member and said sliding member, spring means connected to said sliding member to keep said second wire always in tension and to position said sliding member as a function of the lengths of said first and second wires, said second wire having a different temperature coefficient of expansion than said first wire to permit movement of said sliding member as a function of variations of temperature of fluid in said conduit.

References Cited in the file of this patent

UNITED STATES PATENTS

| | | |
|---|---|---|
| Re. 19,261 | Tyden | July 31, 1934 |
| 2,010,148 | Goss | Aug. 6, 1935 |
| 2,565,713 | Allen | Aug. 28, 1951 |
| 2,646,680 | Steele et al. | July 28, 1953 |
| 2,737,554 | Tiffany | Mar. 6, 1956 |
| 2,753,715 | Brady | July 10, 1956 |
| 2,786,713 | Donaldson | Mar. 26, 1957 |